United States Patent
Hasberg et al.

(10) Patent No.: US 11,733,373 B2
(45) Date of Patent: Aug. 22, 2023

(54) METHOD AND DEVICE FOR SUPPLYING RADAR DATA

(71) Applicant: Robert Bosch GmbH, Stuttgart (DE)

(72) Inventors: Carsten Hasberg, Ilsfeld-Auenstein (DE); Piyapat Saranrittichai, Korntal-Muenchingen (DE); Tayyab Naseer, London (GB)

(73) Assignee: ROBERT BOSCH GMBH, Stuttgart (DE)

(*) Notice: Subject to any disclaimer, the term of this patent is extended or adjusted under 35 U.S.C. 154(b) by 213 days.

(21) Appl. No.: 17/076,426

(22) Filed: Oct. 21, 2020

(65) Prior Publication Data
US 2021/0124040 A1   Apr. 29, 2021

(30) Foreign Application Priority Data
Oct. 29, 2019   (DE) .......................... 102019216607.5

(51) Int. Cl.
| | | |
|---|---|---|
| *G01S 13/89* | (2006.01) | |
| *G01S 13/931* | (2020.01) | |
| *G01S 13/86* | (2006.01) | |

(52) U.S. Cl.
CPC .............. *G01S 13/89* (2013.01); *G01S 13/86* (2013.01); *G01S 13/931* (2013.01)

(58) Field of Classification Search
CPC ......... G01S 13/89; G01S 13/86; G01S 13/931
See application file for complete search history.

(56) References Cited

U.S. PATENT DOCUMENTS

| | | | | |
|---|---|---|---|---|
| 2018/0038694 | A1* | 2/2018 | Bruemmer | ........... G01C 21/005 |
| 2019/0331497 | A1* | 10/2019 | Vora | ........................ G01C 21/28 |
| 2021/0027113 | A1* | 1/2021 | Goldstein | ........... G06K 9/6289 |

OTHER PUBLICATIONS

Carle et al., "Global Rover Localization by Matching Lidar and Orbital 3D Maps," IEEE International Conference on Robotics and Automation, 2010. Retrieved from the Internet on Oct. 20, 2020: http://fileadmin.cs.lth.se/ai/Proceedings/ICRA2010/MainConference/data/papers/0086.pdf. 6 Pages.

Vysotska et al., "Exploiting Building Information from Publicly Available Maps in Graph-Based SLAM," IEEE/RSJ International Conference on Intelligent Robots and Systems, 2016. Retrieved from the Internet on Oct. 20, 2020: http://www.ipb.uni-bonn.de/wp-content/papercite-data/pdf/vysotska16iros.pdf. 6 Pages.

Wang et al., "A Review of Road Extraction from Remote Sensing Images," Journal of Traffic and Transportation Engineering, 3(3), 271-282, 2016. Retrieved from the internet on Oct. 20, 2020: https://reader.elsevier.com/reader/sd/pii/S2095756416301076?token=730ECC903FE1AD127C63D9880D12D55693CFB7DA05360D322E8D489958BC31E1942AB0B86D44B28EA7261163891D946E. 12 Pages.

(Continued)

*Primary Examiner* — Peter M Bythrow
*Assistant Examiner* — Nazra Nur Waheed
(74) *Attorney, Agent, or Firm* — Norton Rose Fulbright US LLP; Gerard Messina

(57) ABSTRACT

A computer-implemented method for supplying radar data. The method includes the following steps: receiving input data, the input data including satellite images; generating radar data using a trained machine learning algorithm, which is applied to the input data; and outputting the generated radar data.

8 Claims, 3 Drawing Sheets

(56) References Cited

OTHER PUBLICATIONS

Mnih et al., "Learning to Detect Roads in High-Resolution Aerial Images," European Conference on Computer Vision (ECCV), 2010. Retrieved from the Internet on Oct. 20, 2020: https://www.cs.toronto.edu/~hinton/absps/road_detection.pdf. 14 Pages.

Xia et al. "Road Extraction from High Resolution Image with Deep Convolution Network—A Case Study of GF-2 Image," International Electronic Conference on Remote Sensing, 2018. Retrieved from the Internet on Oct. 20, 2020: https://www.researchgate.net/publication/323961790_Road_Extraction_from_High_Resolution_Image_with_Deep_Convolution_Network_-_A_Case_Study_of_GF-2_Image. 6 Pages.

\* cited by examiner

METHOD AND DEVICE FOR SUPPLYING RADAR DATA

CROSS REFERENCE

The present application claims the benefit under 35 U.S.C. § 119 of German Patent Application No. DE 102019216607.5 filed on Oct. 29, 2019, which is expressly incorporated herein by reference in its entirety.

FIELD

The present invention relates to a computer-implemented method for supplying radar data, to a device for supplying radar data, a computer program and a non-volatile, computer-readable memory medium.

BACKGROUND INFORMATION

In the field of automated driving, the precise localization of the vehicle is required, which may be used for estimating the positions of the components of the vehicle. Radar data are able to be used for the localization. The radar data may encompass dense point clouds, which are generated with the aid of radar measurements. Vehicles can drive through the regions to be detected and radar maps are generated based on radar measurements of the vehicles. However, the generation of the radar map consumes considerable time because all roads in the region to be detected have to be traveled. The generation of the radar maps is also expensive because considerable expense may arise for vehicles, fuel and drivers.

A localization based on 3D maps is described in Carle et al., "Global Rover Localization by Matching Lidar and Orbital 3D Maps," IEEE International Conference on Robotics and Automation, 2010.

A method for improving existing maps is described in Vysotska et al., "Exploiting Building Information from Publicly Available Maps in Graph-Based SLAM," IEEE/RSJ International Conference on Intelligent Robots and Systems, 2016.

A method for road segmentation is described in Wang et al., "A Review of Road Extraction from Remote Sensing Images," Journal of Traffic and Transportation Engineering, 3(3), 271-282, 2016. A further such method is described in Mnih et al., "Learning to Detect Roads in High-Resolution Aerial Images," European Conference on Computer Vision (ECCV), 2010.

A method based on neural networks is described in Xia et al. "Road Extraction from High Resolution Image with Deep Convolution Network—A Case Study of GF-2 Image," International Electronic Conference on Remote Sensing, 2018.

SUMMARY

According to a first aspect, the present invention relates to a computer-implemented method for supplying radar data. Input data which include satellite images are received. With the aid of a trained machine learning algorithm, which is applied to the input data, radar data are generated. The generated radar data are output.

According to a second aspect, the present invention relates to a device for supplying radar data, which has an input interface, a processing unit, and an output interface. The input interface is designed to receive input data, the input data including satellite images. The processing unit is designed to generate radar data using a trained machine learning algorithm, which is applied to the input data. The output interface is designed to output the generated radar data.

According to a third aspect, the present invention relates to a computer program which when executed on a computer, induces the computer to control the execution of the steps of the computer-implemented method according to the first aspect.

According to a fourth aspect, the present invention relates to a non-volatile, computer-readable memory medium, which stores an executable computer program which when executed on a computer, induces the computer to control the execution of the steps of the computer-implemented method according to the first aspect.

Preferred embodiments of the present invention are described herein.

Satellite images are well suited to detecting large regions. Moreover, satellite images are typically available at a reasonable cost. The present invention utilizes the fact that certain structures are easily detectable both in satellite images and in radar measurements. Both methods in particular detect road structures such as posts, guardrails or traffic signs very well. This allows for a computer-implemented transmission of the satellite images in radar data.

In addition, the radar data are able to be generated without an undue investment in time because no travel along the roads in the region to be detected is required.

According to the present invention, 'generated radar data' should be understood as synthetic radar data, which were generated with the aid of the satellite images. These should correspond as closely as possible to real radar data generated by radar measurements.

According to one specific embodiment of the computer-implemented method in accordance with the present invention, radar data are generated by radar sensors of a motor vehicle. The radar data generated with the aid of the radar sensors of the motor vehicle are compared to the radar data generated based on the satellite images. The motor vehicle is located on the basis of the comparison. Excellent scalability is advantageous in this context. If satellite images are available in a region, then the localization there is able to be carried out directly. This allows for a localization in many regions.

According to one specific embodiment of the computer-implemented method in accordance with the present invention, the application of the trained machine learning algorithm to the input data includes a semantic segmentation of the satellite images. In particular certain structures such as traffic lane markings, traffic signs, guardrails and similar things are able to be automatically detected.

According to one specific embodiment of the computer-implemented method in accordance with the present invention, radar segment images in which radar measurements are to be expected are generated with the aid of the semantic segmentation. The machine learning algorithm allocates values for the radar cross section (RCS) to the pixels in the radar segment images.

According to a specific embodiment of the computer-implemented method in accordance with the present invention, the pixels of the satellite images are two-dimensional at the outset. The values for the radar cross section allocated to the pixels are transformed in point clouds of radar measurements in a three-dimensional world coordinate system.

According to a specific embodiment of the computer-implemented method in accordance with the present invention, altitude information is taken into account when the two-dimensional coordinates are transformed into the three-dimensional coordinates.

According to a specific embodiment of the computer-implemented method in accordance with the present invention, the generated radar data include point clouds. Alternatively or additionally, the generated radar data may encompass Gaussian distributions.

According to a specific embodiment of the computer-implemented method in accordance with the present invention, radar maps are produced by an extraction of features with the aid of the point clouds and/or Gaussian distributions.

According to a specific embodiment of the computer-implemented method in accordance with the present invention, the machine learning algorithm is trained by monitored learning. In particular, the machine learning algorithm may be based on a deep learning model for semantic segmentation.

According to a specific embodiment of the computer-implemented method in accordance with the present invention, the training of the machine learning algorithm by monitored learning takes place with the aid of training data, the training data including satellite images as input data and real radar data as output data. The real radar data correspond to radar segment images that correspond to projections of the values of radar cross sections of real radar measurements. The radar data acquired in the real radar measurements are typically available in a radar coordinate system. The radar data are transformed from the radar coordinate system into a world coordinate system. This makes it possible to image the radar data directly onto the satellite images.

The numbering of method steps is provided for reasons of clarity and is generally not meant to imply a certain sequence in time. It is particularly also possible to carry out multiple method steps simultaneously.

DETAILED DESCRIPTION OF EXAMPLE EMBODIMENTS

Figure 1:
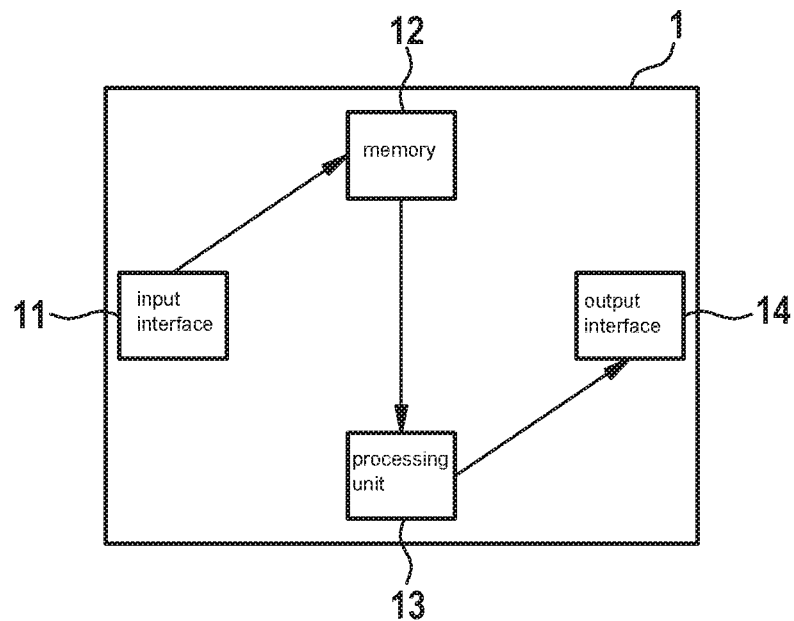
FIG. 1 shows a schematic block diagram of a device for supplying radar data according to a specific embodiment of the present invention.

FIG. 1 shows a schematic block diagram of a device 1 for supplying radar data according to a specific embodiment of the present invention. Device 1 includes an input interface 11 for the supply of input data. Via a cable connection or a wireless connection, the input interface is able to be connected to at least one external device, in particular to a satellite system or a server in order to receive the input data. The input data include satellite images. Satellite images may be understood both as a single satellite image and a multitude of satellite images. The input data may include additional information such as altitude information or semantic labels of the satellite images.

Device 1 furthermore has a memory 12 in which the received input data are stored. Further data, which are required in order to execute a trained machine learning algorithm, are able to be stored in memory 12.

In addition, device 1 has a processing unit 13, which is designed to execute the trained machine learning algorithm. Processing unit 13 may include at least one of the following: processors, microprocessors, integrated circuits, ASICs and the like. Processing unit 13 accesses the input data stored in memory 12. Using the trained machine learning algorithm, processing unit 13 detects segments in the satellite images in which radar measurements may occur. The segments thus correspond to objects or structures at which the radar beams are reflected. Processing unit 13 is able to identify pixels in the satellite images that correspond to these segments. The pixels correspond to spatial positions at which radar reflections may occur.

The machine learning algorithm may have been trained with the aid of training data that include satellite images as input data as well as real radar data as output data. Processing unit 13 may be designed to carry out the training of the machine learning algorithm on its own. As an alternative, it is also possible that an already trained machine learning algorithm is made available.

Processing unit 13 is able to allocate values for a radar cross section to the pixels corresponding to spatial positions in which radar reflections may occur. The values are also able to be generated with the aid of the trained machine learning algorithm.

In addition, processing unit 13 may be designed to transform the values for the radar reflections allocated to the two-dimensional pixels into three-dimensional point clouds, for which altitude information is able to be taken into account.

Finally, processing unit 13 may be designed to produce radar maps with the aid of the three-dimensional point clouds, features being able to be extracted.

The radar maps are able to be supplied in any representational manner. For example, instead of point clouds or in addition to the point clouds, Gaussian distributions may be generated.

Input interface 11 is furthermore able to receive real radar data that are generated by radar sensors of a motor vehicle. Processing unit 13 is designed to compare the received real radar data to the synthetic radar data generated with the aid of the satellite images. Based on the comparison, e.g., by registration of the real radar data and the synthetic radar data, it is possible to locate the motor vehicle. Processing unit 13 is able to output the position of the motor vehicle. In particular, driver assistance systems are able to control functions of the motor vehicle based on the localization of the motor vehicle.

In addition, device 1 has an output interface 14 for the output of the synthetic radar data or for the localization of the motor vehicle. Output interface 14 may be identical with input interface 11.

Figure 2:
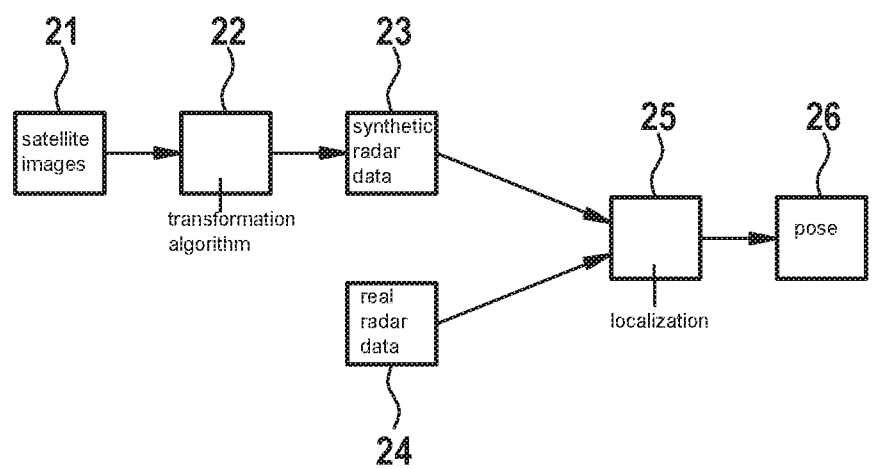
FIG. 2 shows a schematic block diagram in order to describe the localization of a motor vehicle with the aid of radar data that were generated on the basis of satellite images in accordance with an example embodiment of the present invention.

FIG. 2 shows a schematic block diagram in order to describe the localization of a motor vehicle with the aid of radar data generated based on satellite images. Satellite images 21 are made available. A transformation algorithm 22, which generates synthetic radar data 23, is applied to satellite images 21. The transformation algorithm is based on the afore-described trained machine learning algorithm. Real radar data 24, which are generated by radar sensors of a motor vehicle, are additionally made available. With the aid of a comparison, a localization 25 of the motor vehicle is performed. Pose 26 of the motor vehicle is able to be ascertained based on the localization of the motor vehicle.

Figure 3:
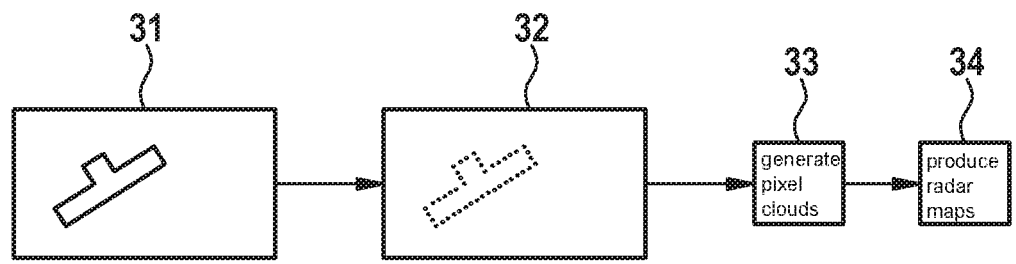
FIG. 3 shows a schematic block diagram in order to describe the generation of radar data with the aid of satellite images in accordance with an example embodiment of the present invention.

FIG. 3 shows a schematic block diagram in order to describe the generation of radar data with the aid of satellite images. A satellite image 31 is supplied in which certain structures such as traffic lane demarcations can be seen. Through a semantic segmentation, pixels and segments corresponding to structures that reflect radar beams are identified with the aid of the trained machine learning algorithm. Moreover, values for the radar cross section are allocated to the pixels. From this, pixel clouds 33 are generated. Radar maps 34 are produced by the extraction of features.

Figure 4:
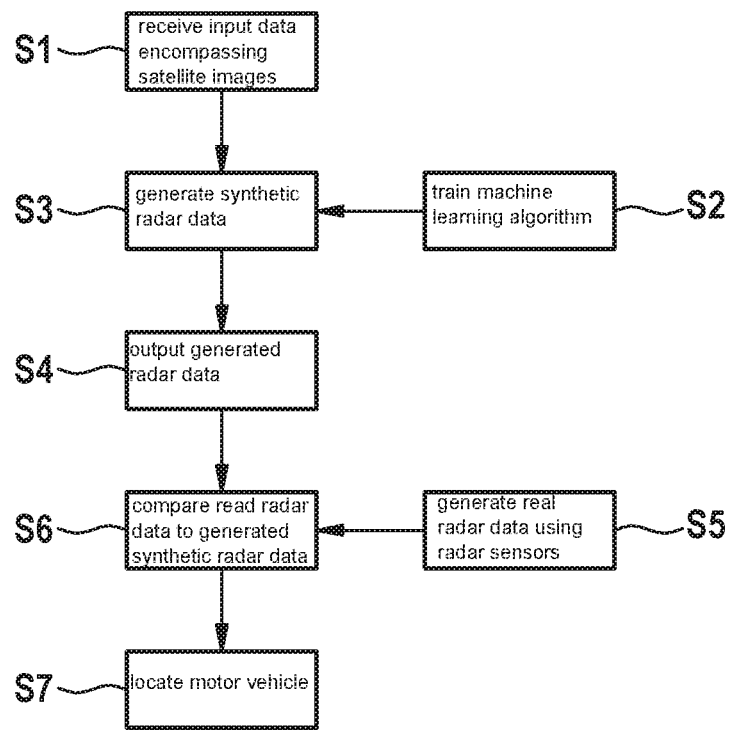
FIG. 4 shows a flow diagram of a computer-implemented method for supplying radar data according to a specific embodiment of the present invention in accordance with an example embodiment of the present invention.

FIG. 4 shows a flow diagram of a computer-implemented method for supplying radar data according to a specific embodiment of the present invention. The method is able to be carried out by an afore-described device 1. Conversely, device 1 may be developed to carry out the method described in the following text.

In a first method step S1, input data which encompass satellite images are received.

In a method step S2, a machine learning algorithm is trained. Certain satellite images are supplied as input data for this purpose and radar data corresponding to the satellite images are supplied as output data in order to carry out monitored learning. The machine learning algorithm trained in this manner is then able to be applied to a wide variety of satellite images. The radar data for the training are optionally able to be prepared. For example, an annotation may be made by a user. It may also be provided to implement an automatic annotation. An excellent global localization of the radar data is thereby able to be achieved at a reduced work investment.

In a method step S3, synthetic radar data are generated by applying the trained machine learning algorithm to the input data. Toward this end, radar segments or pixels which correspond to objects from which radar radiation is reflected may first be identified. In addition, values for the radar cross section are indicated for the pixels. With the aid of altitude information, for example, three-dimensional radar data are able to be generated such as in the form of point clouds and/or Gaussian distributions. The extraction of features moreover makes it possible to produce radar maps that additionally include information pertaining to certain structures.

In a method S4, the generated radar data are output.

The present method may furthermore be used for locating a motor vehicle. Toward this end, radar sensors of the motor vehicle generate real radar data in a fifth method step S5.

In a method step S6, the real radar data generated with the aid of the radar sensors are compared to the synthetic radar data generated with the aid of the satellite images. In particular, a registration may be carried out, i.e. the real radar data are rotated and shifted in such a way that they agree or coincide as closely as possible with the synthetic radar data.

This makes it possible to locate the motor vehicle in a further method step S7. A pose of the motor vehicle, in particular, is able to be calculated. Certain driving functions may be automatically controlled using the localization of the motor vehicle.

Figure 5:
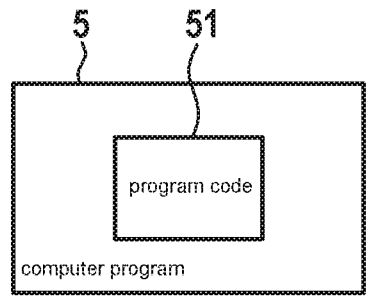
FIG. 5 shows a schematic block diagram of a computer program according to a specific embodiment of the present invention.

FIG. 5 shows a schematic block diagram of a computer program 5 according to a specific embodiment of the present invention. Computer program 5 includes executable program code 51, which when executed on a computer induces the computer to control and/or carry out the afore-described, computer-implemented method for supplying radar data.

Figure 6:
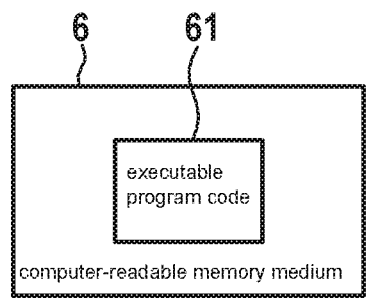
FIG. 6 shows a schematic block diagram of a non-volatile, computer-readable memory medium according to a specific embodiment of the present invention.

FIG. 6 shows a schematic block diagram of a non-volatile, computer-readable memory medium 6 according to a specific embodiment of the present invention. Memory medium 6 includes executable program code 61, which when executed on a computer induces the computer to control and/or carry out the afore-described computer-implemented method for supplying radar data.

What is claimed is:

1. A computer-implemented vehicle-operation method comprising the following steps:
   receiving, by a processor, satellite-generated visible images;
   applying the received satellite-generated visible images to a trained machine learning algorithm executed by the processor, wherein:
      the processor, by the execution of the trained machine learning algorithm, transforms the satellite-generated visible images into synthetic radar data; and
      the transformation includes identifying pixels corresponding to structures that reflect radar beams and assigning respective radar cross section values to said identified pixels of the satellite-generated visible images;
   sensing, by a radar of the vehicle, an environment of the vehicle, thereby generating real radar data;
   comparing, by the processor, the real radar data to the synthetic radar data;
   based on the comparison, registering, by the processor, the real radar data to the synthetic radar data by rotating and shifting the real radar data to obtain a best fit of the real radar data to the synthetic radar data;
   based on the registration, determining, by the processor, a pose of the vehicle relative to imagery of the satellite-generated visible images; and
   based on the determined pose, controlling, by the processor, an automated drive of the vehicle.

2. The method as recited in claim 1, wherein the transformation further includes a semantic segmentation of the satellite-generated visible images.

3. The method as recited in claim 1, wherein the transformation further includes generating point clouds and/or Gaussian distributions based on the assigned radar cross section values.

4. The method as recited in claim 3, wherein the generated synthetic radar data is in a form of a radar map generated using the point clouds and/or the Gaussian distributions.

5. The method as recited in claim 1, further comprising the following step:
   training the machine learning algorithm by monitored learning.

6. The method as recited in claim 5, wherein the training of the machine learning algorithm by monitored learning takes place based on training data, the training data including satellite images as input data and real radar data as output data.

7. A system of a vehicle for operation of the vehicle, the system comprising:
   a radar;

a processor; and an input interface via which the processor is configured to receive satellite-generated visible images;

wherein:

the processor is configured to apply the received satellite-generated visible images to a trained machine learning algorithm executed by the processor;

the execution of the trained machine learning algorithm causes the processor to transform the satellite-generated visible images into synthetic radar data;

the transformation includes identifying pixels corresponding to structures that reflect radar beams and assigning respective radar cross section values to said identified pixels of the satellite-generated visible images; and the processor is further configured to:

obtain real radar data by sensing an environment of the vehicle;

compare the real radar data to the synthetic radar data;

based on the comparison, register the real radar data to the synthetic radar data by rotating and shifting the real radar data to obtain a best fit of the real radar data to the synthetic radar data;

based on the registration, determine a pose of the vehicle relative to imagery of the satellite-generated visible images; and based on the determined pose, control an automated drive of the vehicle.

8. A non-transitory, non-volatile, computer-readable memory medium on which is stored a computer program that is executable by a computer of a vehicle and that, when executed by the computer, causes the computer to perform a vehicle-operation method, the method comprising the following steps:

receiving satellite-generated visible images;

applying the received satellite-generated visible images to a trained machine learning algorithm executed by the computer, wherein:

the computer, by the execution of the trained machine learning algorithm, transforms the satellite-generated visible images into synthetic radar data; and the transformation includes identifying pixels corresponding to structures that reflect radar beams and assigning respective radar cross section values to said identified pixels of the satellite-generated visible images;

obtaining, from a radar of the vehicle, real radar data generated by the radar by sensing an environment of the vehicle;

comparing the real radar data to the synthetic radar data;

based on the comparison, registering the real radar data to the synthetic radar data by rotating and shifting the real radar data to obtain a best fit of the real radar data to the synthetic radar data;

based on the registration, determining a pose of the vehicle relative to imagery of the satellite-generated visible images; and based on the determined pose, controlling an automated drive of the vehicle.

\* \* \* \* \*